US010223729B2

(12) United States Patent
Douglas et al.

(10) Patent No.: US 10,223,729 B2
(45) Date of Patent: Mar. 5, 2019

(54) ECOMMERCE HIGH VOLUME ORDER MANAGEMENT SYSTEM AND METHOD

(71) Applicant: Digital River, Inc., Minnetonka, MN (US)

(72) Inventors: Ryan Patrick Douglas, Edina, MN (US); Samuel Fast Morris, Minneapolis, MN (US); Michael Edwin Olsen Borchert, Minneapolis, MN (US); Amit S Bartake, Eden Prairie, MN (US); Sean Walbran, St. Paul, MN (US); Glenn Aaron Stolar, Chanhassen, MN (US); Steven J Hardek, Victoria, MN (US)

(73) Assignee: Digital River, Inc., Minnetonka, MN (US)

( * ) Notice: Subject to any disclaimer, the term of this patent is extended or adjusted under 35 U.S.C. 154(b) by 955 days.

(21) Appl. No.: 13/948,073

(22) Filed: Jul. 22, 2013

(65) Prior Publication Data

US 2014/0025535 A1    Jan. 23, 2014

Related U.S. Application Data

(60) Provisional application No. 61/673,992, filed on Jul. 20, 2012.

(51) Int. Cl.
*G06Q 10/06*   (2012.01)
*G06Q 10/08*   (2012.01)
*G06Q 30/06*   (2012.01)

(52) U.S. Cl.
CPC ....... *G06Q 30/0633* (2013.01); *G06Q 10/063* (2013.01); *G06Q 10/08* (2013.01)

(58) Field of Classification Search
CPC .............................. G06Q 20/10; G06Q 30/06
See application file for complete search history.

(56) References Cited

U.S. PATENT DOCUMENTS

| 9,043,228 B1 * | 5/2015 | Ross, Jr. ................ G06Q 30/06 705/14.19 |
| 2004/0068461 A1 * | 4/2004 | Schluetter .............. G06Q 20/10 705/37 |

(Continued)

OTHER PUBLICATIONS

Sun Meng and Farhad Arbab., "Web Services Choreography and Orchestrations in Reo and Constraint Automata," SAC '07 Proceedings of the 2007 ACM Symposium on Applied Computing, pp. 346-353 (Mar. 2007).*

(Continued)

*Primary Examiner* — Virpi H Kanervo
(74) *Attorney, Agent, or Firm* — Lynn Marie Holly; Billion & Armitage (57) ABSTRACT

A high volume order management system is disclosed. Order capture and order processing are separated in order to allow the maximum number of orders to be captured during a short period of time. An order capture system is integrated with each website on which the product is offered. The system is comprised of a number of pods which are further comprised of order capture web pages, business rules and modules designed to capture orders as quickly as possible while still preventing fraudulent orders and providing the shopper with an expectation of whether the purchase attempt was successful. Orders are collected in a file and are subsequently processed by a global ecommerce system.

19 Claims, 7 Drawing Sheets

(56) References Cited

U.S. PATENT DOCUMENTS

| | | | |
|---|---|---|---|
| 2008/0222004 A1* | 9/2008 | Pollock | G06Q 30/0603 |
| | | | 705/15 |
| 2009/0012806 A1* | 1/2009 | Ricordi | G06F 3/03545 |
| | | | 705/16 |
| 2009/0167553 A1* | 7/2009 | Hong | G06Q 10/02 |
| | | | 340/4.61 |
| 2011/0173017 A1* | 7/2011 | Salonen | G06Q 10/02 |
| | | | 705/1.1 |
| 2011/0258083 A1* | 10/2011 | Ren | G06Q 10/087 |
| | | | 705/27.1 |

OTHER PUBLICATIONS

Joong Hyuk Chang and Wong Suk Lee, "Finding Recent Frequent Itemsets Adaptively over Online Data Streams," KDD '03 Proceedings of the Ninth ACM SIGKDD International Conference on Knowledge Discovery and Data Mining, pp. 487-492 (Aug. 2003).*

H.D. Richards et al., "Flow of Orders through a Virtual Enterprise," Computing and Control Engineering Journal, vol. 8, Iss. 4, pp. 173-179 (Aug. 1997).*

* cited by examiner

ECOMMERCE HIGH VOLUME ORDER MANAGEMENT SYSTEM AND METHOD

RELATED APPLICATIONS

This application claims the benefit of U.S. provisional Application No. 61/673,992 filed 20 Jul. 2012, entitled "Ecommerce High Volume Order Capture System and Method," which is incorporated herein by reference.

TECHNICAL FIELD

This disclosure relates generally to the sale of products over the Internet. More particularly, this disclosure relates to the sale of high volume, high demand products over the Internet.

BACKGROUND

Occasionally, novel products are introduced into the marketplace with their demand far exceeding their supply. Take, for example, Apple's iPad and iPad2. These items were launched to crowds of consumers waiting outside stores for hours to purchase a limited supply of products. While the seller (i.e. manufacturer, retailer, etc.) may be overjoyed at the demand, such a situation does not create a good customer experience. Purchasers may stand in line for hours only to be told when they reach the counter that there are no products left for them. Anger flares when some consumers purchase multiple quantities for resale on internet auction sites or in foreign countries where the items are not available via legitimate markets, and leave those waiting in line behind them with nothing.

An ecommerce solution solves some of these problems. Rather than wait in line for hours with uncertain results, consumers may access an online store to purchase the item. The purchaser could even preorder the item in order to receive it when it hits the market. However, business, technical and functional challenges still exist, especially if the ecommerce system infrastructure and surrounding technology are not prepared to handle unusually high demand.

Periods during which online applications receive an exceptionally high volume of transactions, such as holidays or during preorder or release of long-awaited products, present a number of technical and user-experience related issues. As those of ordinary skill in the computer arts are aware, there are some general issues around traffic that all online applications face with being on the internet. Designing an online system involves designing for performance. Performance is impacted by the interest and interaction with the application online. Whereas a desktop application may involve just one user operating the software at a particular time, users of an online application may number several to millions of people at the same time.

Online applications are architected and sized for performance under normal or typical conditions and do not work well when traffic spikes. For example, the owner of a population of servers with information that is provided frequently to the internet will want that information to be cached in memory so that repeated access to that information is quick and inexpensive. Under load, that cache can benefit performance. However, if the system does not have enough traffic hitting the cache servers, enough to keep the cache "warm" (where cached items are frequently requested), then users who trickle into the site will have poor performance. So, when developers design and build an internet application, they build in an amount of cache and population of web servers that size to the amount of traffic that will normally be expected. That system is then tuned to expect that in most circumstances the users are getting the benefit of the cache. If a spike event occurs, a period of high volume, high demand on the system, the system breaks down.

It is unrealistic, in time and cost, to grow the size of the infrastructure to meet spike, or high demand, loads as they occur, and system issues develop if the system is scaled to operate at the increased level of traffic. Referring again to the caching example above, once the traffic subsides the typical amount of traffic received will not induce the algorithms behind the scenes to keep the cache populated effectively. The infrastructure required for a spike event is poisonous to normal traffic and the infrastructure needed for normal traffic is insufficient to meet the needs of the spike.

For online commerce, poor performance of a web store is associated with a very low close rate. Although users are not physically standing in line, they are in a very real, electronic queue. An electronic queue may be even more congested than a physical queue because of the centralized nature of ecommerce purchasing and the system issues discussed above, resulting in connectivity or communication problems if the system is not sufficiently robust. A high volume of requests headed for the same web server must pass through the network, the network interface to the server and the server's operating system prior to getting to the web server itself. An overload of requests may cause issues at any one of these points, frustrating the user's efforts to get to the destination web server. An overload of requests hitting the web server will result in an unwanted error page presented to a user, who may give up trying to access the site in frustration, or just forget to come back later. If limits are placed on the quantity that may be purchased, the user must not lose his place in queue or he risks losing the item, and the merchant risks losing the sale. Finally, once stock is depleted, the seller may lose any information on the user, who may not be willing to come back when more stock is available.

Due to the constraints and issues around internet communications, and real-time sizing of infrastructure to meet demand (e.g. lack of time and capital), an e-commerce merchant must be prepared with a system solution in order to handle high volume requests. The present disclosure solves these and other problems and offers other advantages over the prior art by providing an additional, integrated architecture that can handle spikes in requests and allow the user to interact in real time without expanding the basic internet commerce infrastructure.

SUMMARY

The present disclosure relates to the e-commerce capture of a high volume of orders in a short period of time. This may include orders that have limited or sufficient inventory. The system and method disclosed offers the ability to include the full commerce suite of products, combined with an excellent user experience, product definition and merchandising, and backend processing functions. In some cases, a storefront may be throttled for shoppers based on the number of existing connections. During a sale customers will receive an automatically refreshing static page that is displayed when no more connections are determined to be available. This experience is generally unacceptable to the merchant due to many factors such as the limited nature of the products for sale and the customer's desire to swiftly complete an order. A company may want to improve the user experience for sale transactions by increasing order throughput and decreasing the need to rely on a throttling service. The techniques described herein may be used to improve the user experience for sale transactions.

According to one example of the disclosure, a method for processing orders for a product of limited supply comprises providing a respective order capture page to each of the plurality of customers; receiving, at respective local servers, order information from each of the plurality of customers; compiling received order information from each of the respective local servers to generate an order list; and processing the generated order list.

According to another example of the disclosure, a device for processing orders for a product of limited supply comprising one or more processors configured to provide a respective order capture page to each of the plurality of customers, receive order information from each of the plurality of customers, compile received order information from each of the respective local servers to generate an order list, and process the generated order list.

According to another example of the disclosure a non-transitory computer readable storage medium has instructions stored thereon that upon execution cause one or more processors of a device to provide a respective order capture page to each of the plurality of customers, receive order information from each of the plurality of customers, compile received order information from each of the respective local servers to generate an order list, and process the generated order list.

According to another example of the disclosure an apparatus for processing orders for a product of limited supply comprises means for providing a respective order capture page to each of the plurality of customers, means for receiving, at respective local servers, order information from each of the plurality of customers, means for compiling received order information from each of the respective local servers to generate an order list, and means for processing the generated order list.

The details of one or more examples are set forth in the accompanying drawings and the description below. Other features, objects, and advantages will be apparent from the description and drawings, and from the claims.

DETAILED DESCRIPTION

In general, this disclosure describes a system and method for capturing a large volume of online orders in a short period of time. The high volume order capture system and method allows an ecommerce merchant to maintain a positive customer experience even when demand for a product is such that a large volume of customers compete for a limited number of connections to an online store. In one example, this disclosure describes an ecommerce system that will capture a high volume of orders in a short period of time, until existing stock has been depleted, and then switch over to capturing pre-orders or information for notification. Throughout the process, the purchaser is provided with an immediate expectation of success in making the purchase.

In one example, a high volume order system described herein benefits from a "shared-nothing" front-end infrastructure. That is, there are no dependencies between the order-taking systems. As a result, capacity can be scaled up linearly by simply adding more systems to a load-balanced cluster. It is the nature of flash sales and product launches that the exact demand and necessary throughput is not well-known prior to the start of the event, and so having the ability to scale out capacity by fast-provisioning order-taking servers can help to ensure that the user-experience goals are met by dynamically adjusting the server footprint based on actual experienced traffic.

Figure 1:
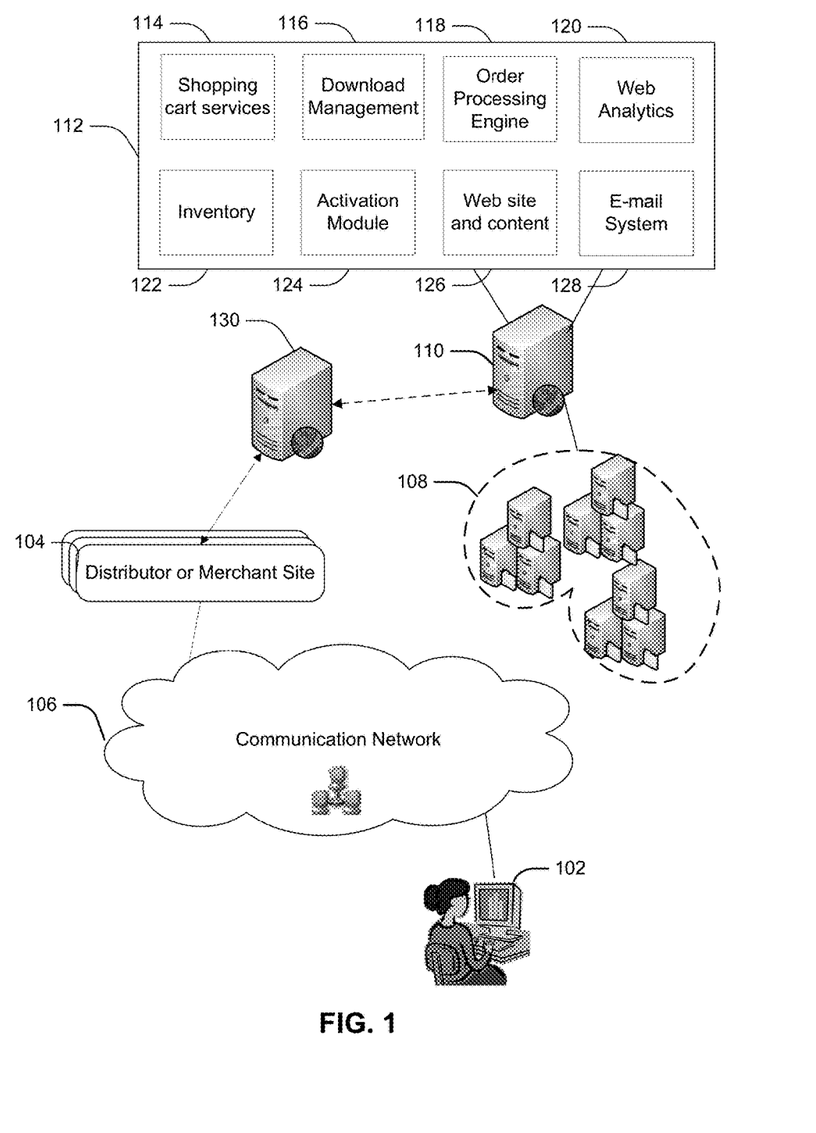
FIG. 1 illustrates an exemplary high volume order capture system for purchasing products online in accordance with the techniques described herein FIG. 2 further illustrates exemplary components and process flow of a high volume order management system that may implement one or more techniques of this disclosure

FIG. 1 illustrates an exemplary high volume order capture system for purchasing products online in accordance with the techniques described herein. In such a system, shoppers or customers 102 access web stores on e-commerce or vendor web sites 104 via a communication network 106, such as, for example, the internet, in order to purchase downloadable or physical items. Each web store operator 104 offering a software manufacturer's software product for purchase and download may further be designated as a distributor 104. A single distributor 104 may host multiple customer-facing e-commerce sites. Each web site may be integrated with a plurality order taker pods 108 that receive orders from the various sites based on technical or other requirements. Each pod 108 contains application servers and a replication of the operational data store (ODS) that captures and records orders taken within the pod and which are later synced with a primary ODS. The pods 108 are further integrated with an ecommerce suite 110 of modules and services that facilitate a full service online store 112. As illustrated in FIG. 1, the ecommerce suite 112 may be comprised of the following modules: shopping cart services 114, download management 116, an order processing engine 118, web analytics 120, inventory 122, activation module 124, web site and content 126, and an email system 128.

A merchant or distributor 104 may provide the ecommerce transactional capabilities through the e-commerce suite 110 to complete the purchase process, and may also provide a Proof of Eligibility (POE) to allow the customer to use the product. Proofs of Eligibility include product keys and other types of eligibility verifiers. POE (also referred to generically as key) may be held in inventory by the software manufacturer 130, the e-commerce system 110 or by the distributor 104. A software manufacturer 130 may want to retain control over the POE inventory for many reasons, including the ability to properly recognize revenue at the time of key delivery. This also offers a benefit to the distributor 104 who then does not have to purchase keys in advance and hold them in inventory. To facilitate distribution of keys to the customer at the time the order is placed, the distributor 104 may be integrated with the software manufacturer's key distribution system 130. In addition, the key distribution system 130 may be integrated with the software manufacturer's database or enterprise resource planning system, recording the data sent in purchase order and return messages from the distributor to the software manufacturer directly into accounting and tracking systems.

A high volume order capture system is comprised of a number of computing devices, as described above. A computer, computing or electronic device or server may be comprised of a memory, a secondary storage device, a processor (central processing unit, or CPU), an input device, a display device, and an output device. The memory may include random access memory (RAM) or similar types of memory. Software applications, stored in the memory or secondary storage for execution by a processor are operatively configured to perform the operations in one embodiment of the system. The software applications may correspond with a single module or any number of modules. Modules of a computer system may be made from hardware, software, or a combination of the two. Generally, software modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

A secondary storage device may include a hard disk drive, floppy disk drive, CD-ROM drive, DVD-ROM drive, or other types of non-volatile data storage, and may correspond with the various equipment and modules shown in the figures. The processor may execute the software applications, modules or programs either stored in memory or secondary storage or received from the Internet or other network. The input device may include any device for entering information into computer, such as a keyboard, joy-stick, cursor-control device, or touch-screen. The display device may include any type of device for presenting visual information such as, for example, a computer monitor or flat-screen display. The output device may include any type of device for presenting a hard copy of information, such as a printer, and other types of output devices include speakers or any device for providing information in audio form.

Although the computer, computing device or server has been described with various components, it should be noted that such a computer, computing device or server can contain additional or different components, modules and configurations. In addition, although aspects of an implementation consistent with the system disclosed are described as being stored in memory, these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. Furthermore, it should be recognized that computational resources can be distributed, and computing devices can be client or server computers. Client computers and devices (e.g.) are those used by end users, such as 102 to access information from a server over a communication network 106. These devices can be a desktop or laptop computer, a standalone desktop, or any other type of computing device. Servers, such as the e-commerce system server 110 and web server and the software manufacturer system server 130, are understood to be those computing devices that provide services to other machines, and can be (but are not required to be) dedicated to hosting applications or content to be accessed by any number of client computers. Web servers, application servers and data storage servers may be hosted on the same or different machines. They may be located together or be distributed across locations. Operations may be performed from a single computing device or distributed across geographically or logically diverse locations.

Client computers 102 connected to the communication network 106 access features of the system described herein using Web services. Web services are self-contained, modular business applications that have open, internet-oriented, standards-based interfaces. According to W3C, the World Wide Web Consortium, a web service is a software system "designed to support interoperable machine-to-machine interaction over a network. It has an interface described in a machine-processable format (specifically web service definition language or WSDL). Other systems interact with the web service in a manner prescribed by its description using Simple Object Access Protocol (SOAP) messages, typically conveyed using hypertext transfer protocol (HTTP) or hypertext transfer protocol secure (HTTPS) with an Extensible Markup Language (XML) serialization in conjunction with other web-related standards." Other technologies, such as JSON and delimited files may also be used. Web services are similar to components that can be integrated into more complex distributed applications.

In one embodiment, the system may be cloud-based, and pods may be provisioned as virtual machines created from a system. The benefit of such an implementation would be to create sufficient temporary resources to accommodate the high volume period, and relinquish those resources when they are no longer required.

Figure 2:
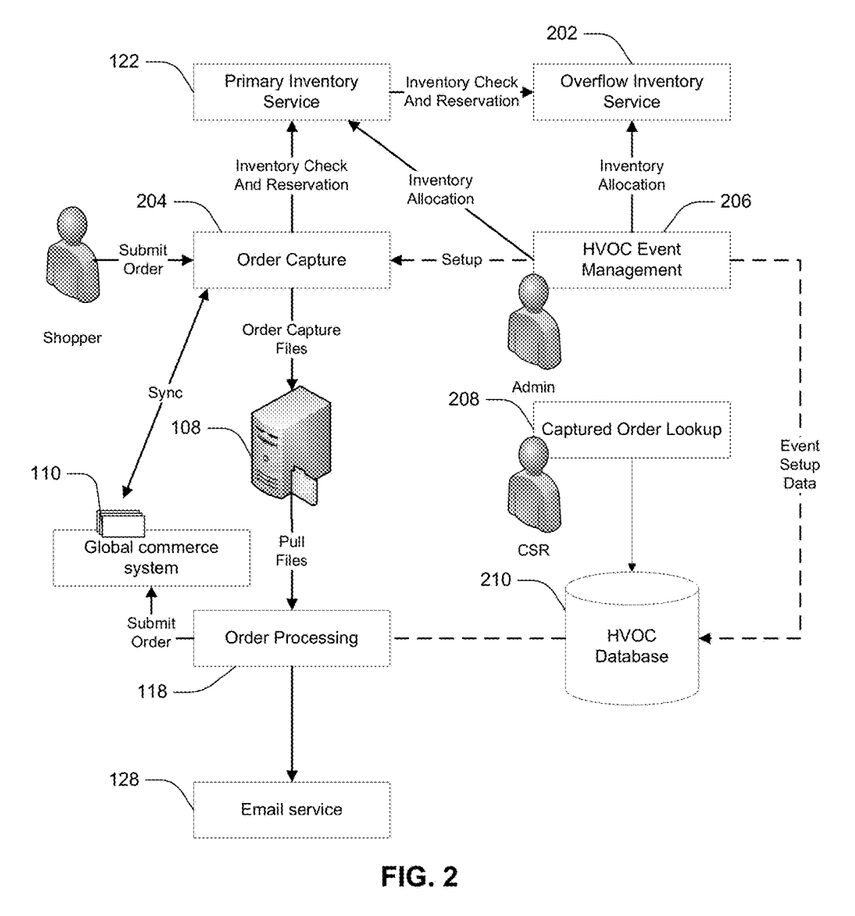

FIG. 2 further illustrates exemplary components of a high volume order management system that may implement one or more techniques of this disclosure. A high volume order management system and method separates submission of orders from order processing in a completely automated manner. Orders taken in a high volume order capture system may be processed on an immediate (limited inventory with high demand) or delayed fulfillment (pre-order for high demand product) basis. The system monitors product availability, processes orders and triggers notifications to customers. A high volume order capture system comprises a module in which a merchant, distributor or software manufacturer may enter, maintain and monitor business rules and terms of sale related to high volume order offerings. As orders are captured, the order processing engine assigns a "place in line" (PIL) ID to ensure orders are processed in the order they are received. As orders are processed, email notifications are sent to those placing orders to notify them of how they fared.

Referring to FIG. 2, the system comprises a primary inventory service 122 and an overflow inventory service 202 for checking and reserving inventory. A High Volume Order Capture (HVOC) Event Management module 206 allows the distributor to set business rules for the high volume event; those rules are stored in a high volume order capture database 210. The order capture module 204 uses those rules in capturing orders. Orders are captured on a file server 108 from which they are later pulled for order processing 118 in a full service global commerce system 110. An email service 128 provides customer notifications. Once the business rules are set up the only human interaction might be shoppers submitting orders and customer service representatives looking up captured orders for customers 208.

Figure 3:
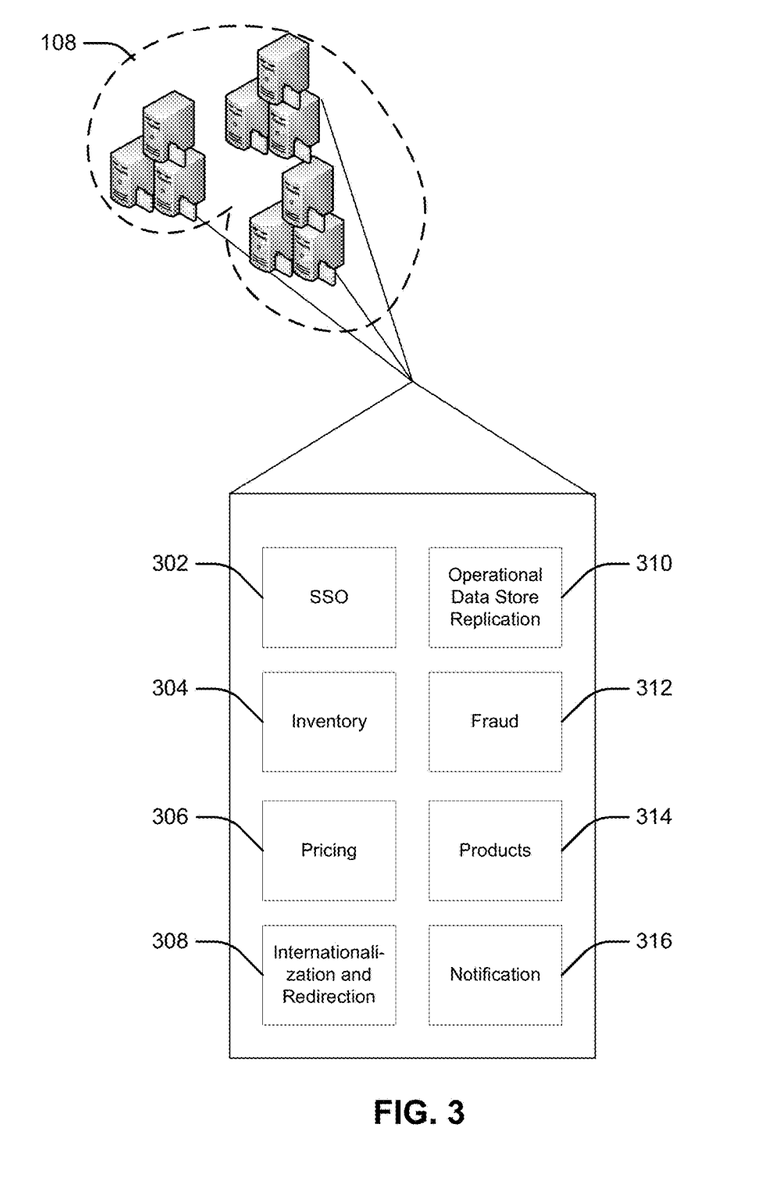
FIG. 3 illustrates an exemplary pod, or order capture server system that may implement one or more techniques of this disclosure

As was discussed above, each website on which the product is offered can be integrated with a number of pods to capture and process orders. FIG. 3 illustrates an exemplary pod, or order capture server system that may implement one or more techniques of this disclosure. Each pod comprises the code and functionality modules required for order capture. The code and functionality modules may be implemented using any combination of hardware, software, and/or firmware. Order capture may include Single Sign On (SSO) for integration with third party providers, inventory allotment 304, pricing 306, geographical detection and internationalization including local availability restrictions 308, a replication of the operational data store 310, fraud detection rules 312, product descriptions and images 314, and logic for determining appropriate customer notifications 316.

Business rules may be set for sale variables, including, but not limited to, the following: available SKUs, payment methods, the number of vendor accounts per order and product bundles. In a typical embodiment, there may be a number of SKUs available for pre-order. Customers may be limited to one vendor account per pre-order purchase. Pre-orders may be charged a pre-order fee and may include additional products that are bundled with a full version of the high-demand item.

Each merchant or distributor web store may have one or more locales, each supported by one or more pods. Locales allow for many customizable features, including appropriate language presentation, product distribution by region and application of appropriate tax and other customized rules. Once the shopper has entered the store, the shopper is redirected based on the IP address of the calling computer. If the IP country falls outside of the existing regions/locales, the customer will be redirected to a generic or catch all page with appropriate messaging.

Figure 4:
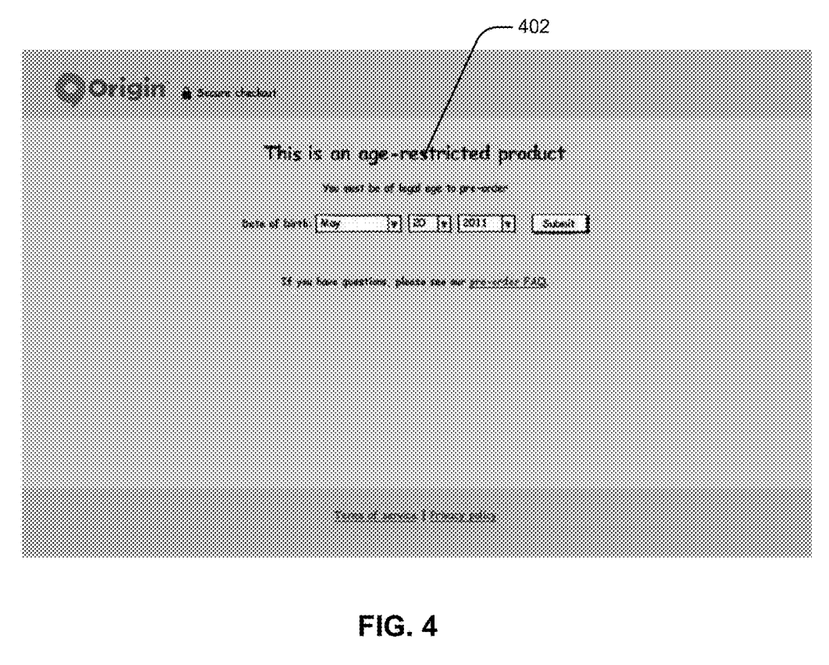
FIG. 4 illustrates an exemplary screen for displaying an "age gate" which requires the user to enter their date of birth before proceeding that may be implemented in accordance with the techniques described herein

One example of a customized rule is the German Youth Protection requirement. The German Youth Protection law restricts the purchase of products by German youths based the product game rating and German time zone. Games with a 12 and 16 year USK rating can be purchased between 22:00 and 6:00. Games with an 18 year rating can be purchase between 23:00 and 6:00. FIG. 4 illustrates an exemplary screen for displaying an "age gate" 402 which requires the user to enter their date of birth before proceeding that may be implemented in accordance with the techniques described herein.

A high volume order capture system is described here in the context of the purchase of a newly released video game product that may either be shipped as a physical product on digital media or downloaded to the purchaser's computer. However, the system is not limited to this context and may be used in to process any kind of internet orders for very high demand (and especially low availability) product.

The approach described herein allows for the mass-submission of orders by separating the tasks of submitting and processing orders. It should be noted that in some cases because processing is a-synchronous the system separates the tasks of submitting and processing has an opportunity to execute any custom business rules the publisher/reseller might have around purchase limits, and other restrictions. Order information including all billing information can be captured on high-throughput orderCapture pages that do not interact with the global commerce system directly. The messaging to shoppers is that their order will be processed in the order it was taken, but that availability is limited, and updates on their order status will follow. While more and more orders are being captured, batches (cleansed to meet purchase-limit requirements) can be sent through the global commerce system at sustainable rates, resulting in either successes or failures. In one example, an order capture system allows for a per-node order capture rate of more than 1000 records per second.

An order list is compiled from all order takers (local servers) for a set time frame. The list is sorted by creation date to enforce a first come-first serve strategy. The list is cleansed to remove duplicate login ids and duplicate payments. The list is matched against already process orders to further remove duplicates. A rolling order count is confirmed for each product ID. Orders are removed from the order list when available limits are reached. After each batch is run, order count can be adjusted to add back unconsumed. Some orders will fail.

Figure 5:
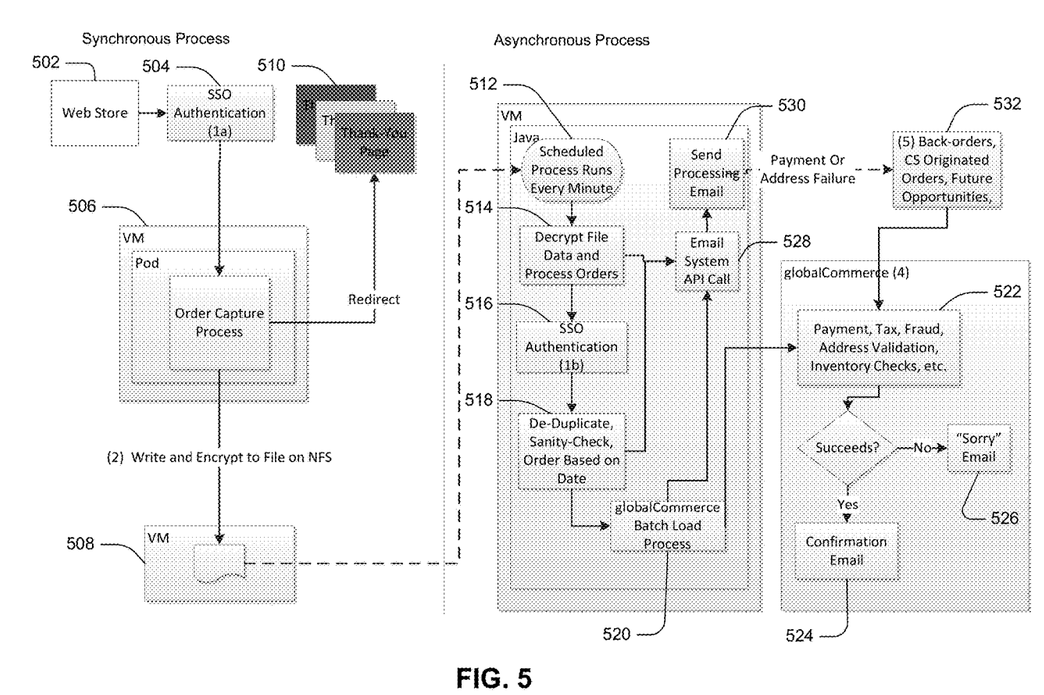
FIG. 5 illustrates the order capture and order processing processes that may be implemented in accordance with the techniques described herein

As is illustrated in FIG. 5, in a preferred embodiment, order capture is a synchronous process, while order processing is asynchronous. A video game manufacturer may be set to release a long-awaited, highly popular video game product and may determine that a pre-order offering should be made. To kick off the preorder event, the manufacturer may invite and direct customers to the product ordering page 502. Single Sign On (SSO) authentication 504 may be used to facilitate the order capture process. The commerce system may redirect each customer to an appropriate, localized order page through IP redirection. The IP address of the shopper's computer is captured in the background. If the shopper does not have a merchant account, the shopper is directed to the merchant site to create a new account, submit the account information, which is then validated and an account is created. The shopper is then redirected to the local order capture page where the forms are completed and the order submitted 506. The process of redirection to local servers is especially helpful when inventory has been distributed according to region. When the customer lands on the local page, the customer inputs order information such as product selection, account information, billing and shipping information (if a physical product is being ordered), and payment information. The customer should agree to terms of sale. When the customer clicks submit, client-side validation ensures a customer has correctly entered information on the order capture page. If errors are present, an inline message is provided with error fields highlighted.

Also upon the customer clicking submit, a software-manufacturer's user authentication service is called for single sign on. If this server side validation fails, the customer is provided with an inline message with error fields highlighted. The information is submitted and the order is written to a secure flat file 508. The customer is redirected to a thank you page 510; the page that is displayed depends on whether the user has successfully "purchased" the item, has been unsuccessful, or may have been successful based on the expected result of the order placement. A thank you page is displayed. This process is illustrated on the left side of FIG. 5.

In a preferred embodiment, the order capture server has an in-memory count of remaining inventory for all products, and if an order is captured for a product whose inventory is below a configured threshold, an appropriate thank-you page is returned. This provides a buffer during the period in which the availability of the product is likely to be determined by how many orders in the processing queue are discarded and inventory is re-allocate back to the order capture servers.

During a pre-order event, individual products may sell out. In order to prevent excessive "red" emails, the products will be greyed out and unselectable when the quantity is sold out. When a product is sold out, the HTML file will be modified to identify a JavaScript array of the product SKU's. When the page loads, it will traverse through the SKU's and disable the appropriate radio button and cross out the title text. Sold out quantities may be updated on a site to site basis. When all of the products are sold, a marketing page may be presented instead of the product page.

Figure 6:
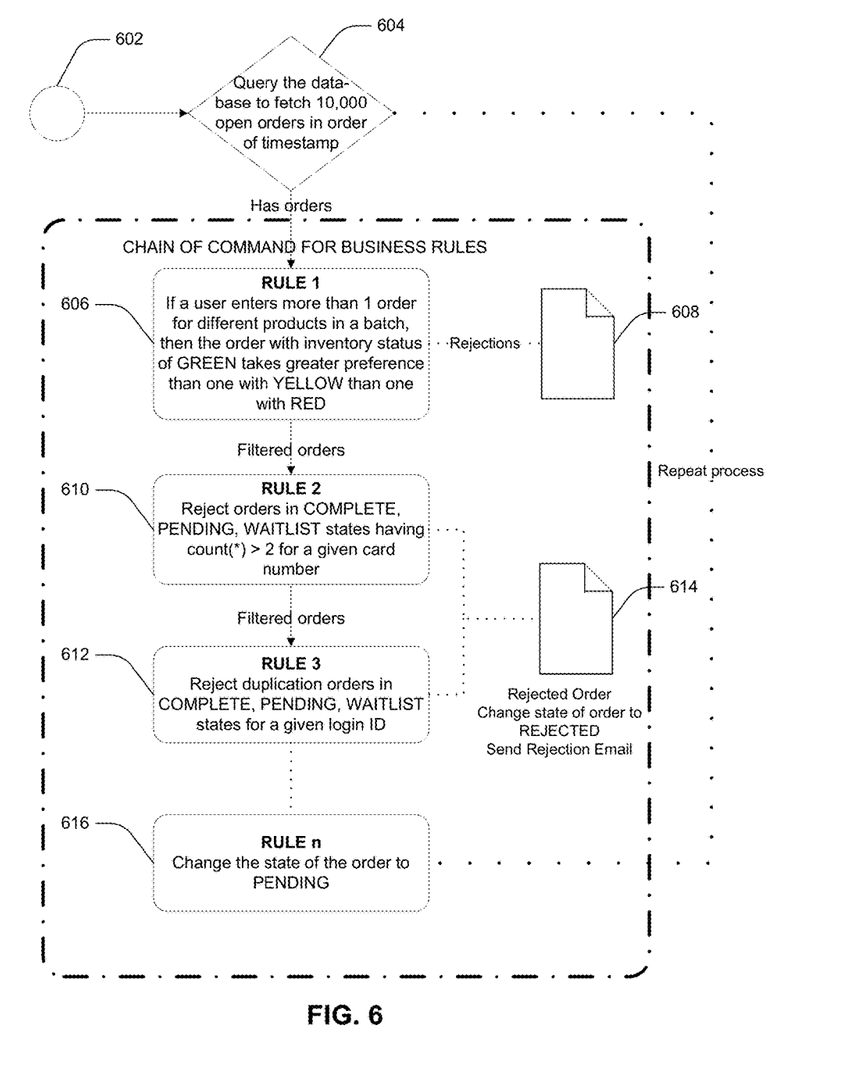
FIG. 6 illustrates a chain of command for business rules applied to order processing in accordance with techniques described herein.

The right side of FIG. 5 illustrates the asynchronous order processing steps. Once orders are written to a flat file 508, a scheduled process 512 runs each minute to retrieve a file (application of business rules to these files is illustrated in FIG. 6 and discussed below). Data is decrypted and orders are processed 514. SSO is used to authenticate the purchaser 516. Orders are de-duplicated and processed based on the PIL number assigned when the order was placed 518. A batch load process 520 is run to feed the orders into the global ecommerce system, where payment, tax, fraud, address validation and inventory checks are all 522 completed. If the order succeeds a confirmation email is sent 524; if not a "sorry" email 526 is sent and the user may attempt to order at a later date Since the system uses SSO on the merchant's web site, logins may be created for each account or verified against current accounts 516. In addition, verification is required for products and for payment processing 522. An order that fails inventory triggers an email 510 to be sent to the shopper thanking him for his interest but expressing sorrow that no quantities were left. If the order passes the login, product purchasing and Centralized Payment Gateway authorization 522 it begins the process each individual order after another. Orders that do not pass payment or address validation trigger a call to the email system 528 and send a notification email 530 to the customer. A notification email may include back order status 532. To comply with pricing shown on the order capture page, taxes, if applicable, are back-calculated from the total. A key is issued from the dispenser for companion items. Preordered line items are processed by issuing a 20 character code form the dispenser, sending it to the vendor using a digital rights request call. The merchant responds to the digital rights request by sending an email to the shopper with a product code, and instructions.

Integration with a global commerce system allows for a number of efficiencies. This allows the entire suite of functionality and features of the global commerce system to be used for the orders, including fraud, web analytics, payment processing, etc. In addition, if the merchant or distributor is a client of the commerce system, the order information can be available for reporting and back-office (e.g. SAP, Oracle Applications, etc.) accounting along with all of its regular transactions.

Referring now to FIG. 6, a chain of command for business rules applied to order processing 512 is illustrated. In this example, orders are captured in a file 602. The batch query 604 runs periodically (for example, once every minute) retrieves 10,000 open orders in order of their time stamp (i.e. PIL indicator). In exemplary rule 1 606, if a user enters more than one order for different products in that batch then the order with inventory status of green takes greater preference than one with yellow than one with red. Duplicates are rejected 608. Those preferred orders are then rejected 610 if they are in complete, pending or wait list states and have a count of greater than 2 for a given credit card number. The orders remaining after application of that rule are searched for duplications of login ID 612, and if duplications are found in complete, pending or waitlist states they are rejected 614. These remaining orders are further filtered to apply all remaining business rules 616, and are then fed back into a cleansed data file.

Figure 7:
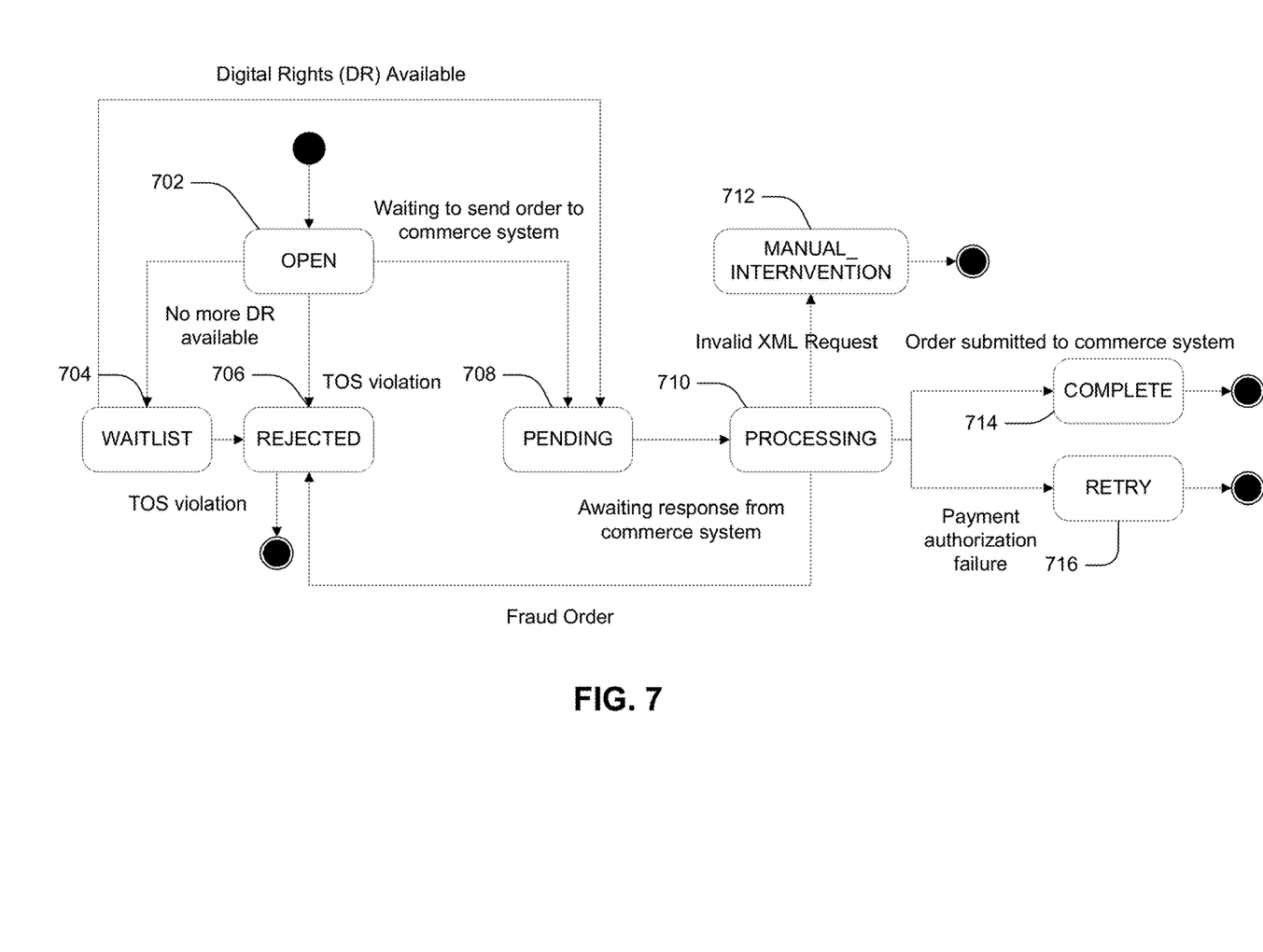
FIG. 7 illustrates an exemplary set of order processing states in accordance with the techniques described herein.

FIG. 7 illustrates an exemplary set of order processing states in accordance with the techniques described herein. Orders imported from the flat file may have an OPEN 702 status. If there are no more digital rights available the order is WAITLISTed 704. However, if a terms of service violation occurs, the order is REJECTED 706 either following the import or waitlist state. Orders that are awaiting import into the global commerce system are PENDING 708. PENDING orders awaiting a response from the global commerce system are PROCESSING 710. If an invalid XML request is received on an order, that order is subject to MANUAL INTERVENTION 712. PROCESSING 710 orders that have been flagged as fraudulent are REJECTED. PROCESSING orders that are successfully submitted in the global commerce system are COMPLETE 714; those where payment authorization fails are RETRY 716 orders.

In the case of digital products controlled by POE, inventory is essentially the number of digital rights available and the distribution of POE or product keys must be incorporated into the system and method. Distribution of keys may be handled in a variety of ways. For example, there may be a cap on the number of pre-orders available. Keys may be allocated to different models or specify a particular model that they will be used for. Once the allotted preorder codes have sold out, they are sold out. Typically, once all preorder key codes have sold out, it should not be possible for customers to order the product. The system may allocate keymaster codes from the fixed codeset list of codes. In some examples, the system may not use dynamic code generation when a customer pre-orders the product. The E-commerce provider or Keymaster should track pre-order code lots issued to retailers. This can be done via a filename prefix attribute in the keymaster request. Each code lot request will receive its own primary_code_set_id.

After purchasing a key-controlled product in a pre-order and regardless of which particular sku the customer pre-ordered, the customer will receive a keymaster key. The keymaster keys will be generated against the keyholding system, which can be on the software manufacturer, the reseller or merchant, or distributor's keymaster lockbox. The total number of keys distributed across all channels retail and digital may be capped. For example, if the product is an online video game, the software manufacturer may need to put a limit on the number of customers who can connect to the game at launch and not overwhelm capacity.

Customers who pre-order digitally may be billed immediately and given a keymaster pre-order code. When the full high demand product is available the customer will automatically be billed the balance without having to return to the store and will be e-mailed the CD key for the full product.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular physical components, software development tools and code and infrastructure management software may vary depending on the particular system design, while maintaining substantially the same features and functionality and without departing from the scope and spirit of the present invention.

What is claimed is:

1. A computing system for capturing and processing order transactions in a high-internet traffic volume environment comprising:

a web server with a non-transitory storage device and a processor configured to host a website with an online store functionality comprising product offers and geographical detection rules, wherein the web server is operatively connected to a plurality of local order taker pods, wherein the web server comprises instructions stored in a memory that when executed by the processor cause a program in the system to determine a geographic location of an order request by the geographical detection rules using an originating IP address or a locale of the order request, and wherein the web server directs the order request to an order taker pod local to a source of the order request;

at least one processor and a non-transitory storage device comprising an e-commerce primary operational data base configured to store data related to order transaction records received from the plurality of local order taker pods, and further comprising instructions stored in a memory which, when executed by the processor, perform order pre-processing functions on the data stored in the e-commerce primary operational database;

the plurality of local order taker pods, wherein each local order taker pod comprises an application server with a processor and a non-transitory storage device, wherein local business rules and regulatory requirements and a replicated primary operational data base are stored in the each local order taker pod, wherein the each local order taker pod is independent of the other local order taker pods and the primary operational data base, wherein the each local order taker pod monitors a primary inventory service for system inventory and for product offers, and wherein the each local order taker pod further comprises instructions stored in a memory which, when executed by the processor, causes a program in the system to perform the steps of:

receiving an online order request from a user computing device through the website, wherein the user computing device is local to a local order taker pod;

presenting prompts from the local order taker pod in response to the received order request, wherein the prompts are in a form of an order capture page;

receiving a response to the presented prompts, wherein the response provides a product identifier;

creating an order record in the replicated primary operational data base of the local order taker pod based on the received product identifier;

time-stamping the order record;

allocating available inventory to the order record by performing a check and reserve call to the primary inventory service;

compiling order records into a local order taker pod order file; and exporting compiled order files from the plurality of local order taker pods to the primary operational data base at a rate determined to be sustainable for an asynchronous order processing:

at least one processor and a non-transitory storage device comprising the primary operational data base configured to:

compile the order files received from the plurality of local order taker pods;

place the order files in sequence by a time-stamp to generate a primary order list;

asynchronously process orders contained in the order files for fulfillment in a chronological order by the time-stamp; and fulfill the orders.

2. The computing system of claim 1, wherein the order capturing system further comprises preprocessing rules and functions performed prior to delivering asynchronous response to the order request by a user, wherein the order capturing system is operatively connected to an order processing system, and wherein order processing and fulfillment are completed asynchronously following the generation of the primary order list.

3. The computing system of claim 1, further comprising:
an order management system configured to fulfill the orders from the primary order list, wherein the order management system assigns a place in a line for the orders on the primary order list, and wherein the orders are processed based on the assigned place in the line.

4. The computing system of claim 1, further comprising an order management system configured to:
fulfill the orders from the primary order list; and
store one or more rules in an order capture data base.

5. The computing system of claim 1, further comprising:
an order management system configured to fulfill the orders from the primary order list;
an order capture data base configured to store one or more rules to be applied to the orders; and
an e-mail service configured to produce notifications in response to applying the one or more rules in the order capture data base.

6. The computing system of claim 5, wherein the e-mail service produces a notification for successfully fulfilling an order.

7. The computing system of claim 5, wherein the e-mail service produces a notification to inform that no quantities of an ordered product are left.

8. The computing system claim 5, wherein the e-mail service produces a notification that includes an access to a product key.

9. The computing system of claim 5, wherein the each local order taker pod includes an order capture page customized for a user location.

10. The computing system of claim 1, wherein a product is a downloadable software product.

11. A computerized method for capturing orders in a high internet traffic volume environment, the method comprising:
receiving an online order request from a user computing device through a website operatively configured to perform online store functionality comprising product offers and geographical detection rules, wherein the user computing device is local to a local order taker pod;

determining, by the processor, a geographic location of the order request by the geographical detection rules using an originating IP address or a locale of the order request;

directing, by the processor, the order request to one of a plurality of local order taker pods operatively connected to the website, wherein each local order taker pod is independent of other local order taker pods and a primary operational data base, wherein the each local order taker pod has a replicated operational data base of the primary operational data base, wherein the each local order taker pod monitors a primary inventory service for system inventory and for product offers, and wherein an order taker pod is local to the source of the order request;

presenting prompts from the local order taker pod in response to the received order request, wherein the prompts are in a form of an order capture page;

receiving a response to the presented prompts, wherein the response comprises a product identifier;

creating, by the processor of the local order taker pod, an order record in the replicated primary operational data base of the local order taker pod based on the received product identifier;

time-stamping the order record;

allocating available inventory to the order record by performing a check and reserve call to the primary system inventory service;

compiling, by the processor of the local order taker pod, order records into a local order taker pod order file;

exporting compiled order files from the plurality of local order taker pods to the primary operational data base at a rate determined to be sustainable for an asynchronous order processing;

compiling, by a processor of the primary operational data base, the order files received from the plurality of local order taker pods;

placing the order files in sequence by a time-stamp to generate a primary order list;

asynchronously processing, by the processor of the primary operational data base, orders contained in the order files for fulfillment in a chronological order by the time-stamp; and fulfilling the orders.

12. The method of claim 11, wherein compiling the received order files from the plurality of order taker hods is performed asynchronously by instructions executed by the processor on a computing device comprising the primary operational data base.

13. The method of claim 12, further comprising fulfilling the orders at a computer that is configured to store the primary operational data base.

14. The method of claim 13, further comprising:
storing a set of rules for fulfilling orders; and
applying at least one rule of the set of rules to an order stored in the primary operational data base.

15. The method of claim 14, wherein applying the at least one rule of the set of rules to the order stored in the primary operational data base includes fulfilling the order based on an assigned place in a line.

16. The method of claim 13, wherein fulfilling the order includes sending a message indicating an order status.

17. The method of claim 12, wherein a product is a downloadable software product.

18. The method of claim 17, further comprising sending a message to provide a product key.

19. A non-transitory computer program product comprising non-transitory computer readable medium having stored therein instructions executable by a processor, wherein the instructions are executable to perform the steps of:

receiving an online order request from a user computing device through a website operatively configured to perform online store functionality comprising product offers and geographical detection rules, wherein the user computing device is local to a local order taker pod;

determining a geographic location of the order request by the geographical detection rules using an originating IP address or a locale of the order request;

directing the order request to one of a plurality of local order taker pods operatively connected to the website, wherein each local order taker pod is independent of other local order taker pods and a primary operational data base, wherein the each local order taker pod has a replicated operational data base of the primary operational data base, wherein the each local order taker pod monitors a primary inventory service for system inventory and for product offers, and wherein an order taker pod is local to the source of the order request;

presenting prompts from the local order taker pod in response to the received order request, wherein the prompts are in a form of an order capture page;

receiving a response to the presented prompts, wherein the response comprises a product identifier;

creating an order record in the replicated primary operational database of the local order taker pod based on the received product identifier;

time-stamping the order record;

allocating available inventory to the order record by performing a check and reserve call to the primary system inventory service;

compiling order records into a local order taker pod order file;

exporting compiled order files from the plurality of local order taker pods to the primary operational data base at a rate determined to be sustainable for an asynchronous order processing;

compiling the order files received from the plurality of local order taker pods;

placing the order files in sequence by a time-stamp to generate a primary order list;

asynchronously processing orders contained in the order files for fulfillment in a chronological order by the time-stamp; and fulfilling the orders.

* * * * *